(12) United States Patent
Cretoiu et al.

(10) Patent No.: US 9,370,728 B2
(45) Date of Patent: Jun. 21, 2016

(54) HEAVY HYDROCARBON REMOVAL SYSTEMS AND METHODS

(71) Applicant: GTC Technology US LLC, Houston, TX (US)

(72) Inventors: Mircea Cretoiu, Sugar Land, TX (US); Joseph C. Gentry, Houston, TX (US); Pradeep Pawar, Katy, TX (US); Song Wang, Katy, TX (US)

(73) Assignee: GTC Technology US LLC, Houston, TX (US)

( * ) Notice: Subject to any disclaimer, the term of this patent is extended or adjusted under 35 U.S.C. 154(b) by 62 days.

(21) Appl. No.: 13/875,157

(22) Filed: May 1, 2013

(65) Prior Publication Data

US 2014/0034446 A1 Feb. 6, 2014

Related U.S. Application Data

(62) Division of application No. 13/133,905, filed as application No. PCT/US2009/067072 on Dec. 8, 2009, now Pat. No. 8,455,709.

(60) Provisional application No. 61/121,153, filed on Dec. 9, 2008.

(51) Int. Cl.
*B01D 11/04* (2006.01)
*C10G 21/28* (2006.01)
*C10G 21/14* (2006.01)

(52) U.S. Cl.
CPC ............. *B01D 11/04* (2013.01); *C10G 21/14* (2013.01); *C10G 21/28* (2013.01); *C10G 2300/4081* (2013.01); *C10G 2300/44* (2013.01); *C10G 2300/805* (2013.01)

(58) Field of Classification Search
None
See application file for complete search history.

(56) References Cited

U.S. PATENT DOCUMENTS

| | | | |
|---|---|---|---|
| 3,544,453 A | 12/1970 | Thompson | |
| 3,864,245 A | 2/1975 | Van Tassell | |
| 3,934,471 A | 1/1976 | White et al. | |
| 4,428,829 A | 1/1984 | Kosters | |
| 4,761,222 A | 8/1988 | Carter et al. | |
| 7,666,299 B2 | 2/2010 | Wu et al. | |
| 7,871,514 B2 | 1/2011 | Lee et al. | |
| 2006/0172939 A1* | 8/2006 | Bellotti | A61K 9/1275 424/529 |
| 2007/0256920 A1* | 11/2007 | Kanauchi | B01D 3/40 203/2 |
| 2008/0060978 A1 | 3/2008 | Wegner | |
| 2008/0210602 A1 | 9/2008 | Duyvesteyn | |
| 2008/0229924 A1 | 9/2008 | Carlsson et al. | |

OTHER PUBLICATIONS

Young, Lee W., "International Search Report" prepared for PCT/US09/67072 as mailed Jan. 26, 2010, 3 pages.

* cited by examiner

*Primary Examiner* — Tam M Nguyen
(74) *Attorney, Agent, or Firm* — Winstead PC

(57) ABSTRACT

Apparatuses and systems for removing heavy hydrocarbons from a solvent stream are disclosed herein. The apparatuses extract heavy hydrocarbons into light hydrocarbons and provide a solvent stream having the heavy hydrocarbons removed. Two water washing steps are used to remove residual solvent from the heavy hydrocarbon solution in light hydrocarbons. In some embodiments, the second water wash is used for processing subsequent batches of the solvent stream. The heavy hydrocarbons and solvent can be recovered and processed further. Methods for removing heavy hydrocarbons from a solvent stream are also disclosed herein.

10 Claims, 2 Drawing Sheets

HEAVY HYDROCARBON REMOVAL SYSTEMS AND METHODS

CROSS-REFERENCE TO RELATED APPLICATIONS

This application is a divisional of application Ser. No. 13/133,905 filed Aug. 29, 2011, now U.S. Pat. No. 8,455,709, which is a national stage application of PCT/US09/67072 filed Dec. 8, 2009, which claims priority to U.S. provisional patent application 61/121,153, filed Dec. 9, 2008, which is incorporated by reference herein in its entirety.

STATEMENT REGARDING FEDERALLY SPONSORED RESEARCH

Not applicable.

BACKGROUND

Heavy hydrocarbons such as bitumen, kerogen, GILSONITE® (trademarked term of the mineral uintahite) and tars are high molecular weight hydrocarbons frequently encountered in the petroleum industry. These heavy hydrocarbons range from thick viscous liquids to solids at ambient temperatures and are generally difficult to recover in useful form. For example, heavy hydrocarbon crude oils and natural bitumens are difficult to handle because their low gravities and high viscosities retard their ability to flow within a reservoir or refinery stream. Furthermore, heavy hydrocarbons can build up over time in various processing streams at a refinery, fouling system output or requiring costly process downtime.

Although heavy hydrocarbons are problematic in refinery processing of petrochemicals, there are a number of applications in which heavy hydrocarbons are useful. Heavy hydrocarbons have been used, for example, as asphalt and tar compositions, including those used for paving roads and roofing or waterproofing applications. Heavy hydrocarbons are also a feedstock for conversion into lighter hydrocarbons, such as olefins and gasoline. Conversion of heavy hydrocarbons into lighter hydrocarbons is typically accomplished by thermal cracking and hydrogenolysis processes, for example.

In view of the foregoing, apparatuses and methods to easily separate heavy hydrocarbons from a solvent stream at a refinery would be of considerable benefit. Such apparatuses and methods would allow more efficient operation of refinery process streams and also provide the heavy hydrocarbons in useful form for further processing.

SUMMARY

In various embodiments, apparatuses for removing heavy hydrocarbons from a solvent stream are disclosed. The apparatuses include a first extractive unit, a second extractive unit and a light hydrocarbon input line coupled to the first extractive unit. The first extractive unit includes a first water input line, a solvent stream output line, and a first heavy hydrocarbon output line. The first heavy hydrocarbon output line is coupled to the second extractive unit. The second extractive unit includes a second water input line, a second water output line, and a second heavy hydrocarbon output line. The second water output line adjoins the first water input line.

In other various embodiments, apparatuses for removing heavy hydrocarbons from a solvent stream include a first extractive unit, a second extractive unit and a light hydrocarbon input line coupled to the first extractive unit. The first extractive unit includes a first water input line, a solvent stream output line, and a first heavy hydrocarbon output line. The first heavy hydrocarbon output line is coupled to the second extractive unit. The first water input line is supplied by condensed stripping steam. The second extractive unit includes a second water input line, a second water output line, and a second heavy hydrocarbon output line.

In other various embodiments, methods for removing heavy hydrocarbons from a solvent stream are disclosed. The methods include a) providing a first batch of a mixture containing heavy hydrocarbons dissolved in at least one solvent, b) extracting the first batch of the mixture with a light hydrocarbon wash, c) washing the first batch of the mixture with a first water wash to produce a solvent stream depleted in heavy hydrocarbons and a heavy hydrocarbon stream dissolved in light hydrocarbons, d) removing the solvent stream depleted in heavy hydrocarbons, e) washing the heavy hydrocarbon stream dissolved in light hydrocarbons with a second water wash, f) removing the second water wash, and g) isolating an output stream containing heavy hydrocarbons dissolved in light hydrocarbons.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
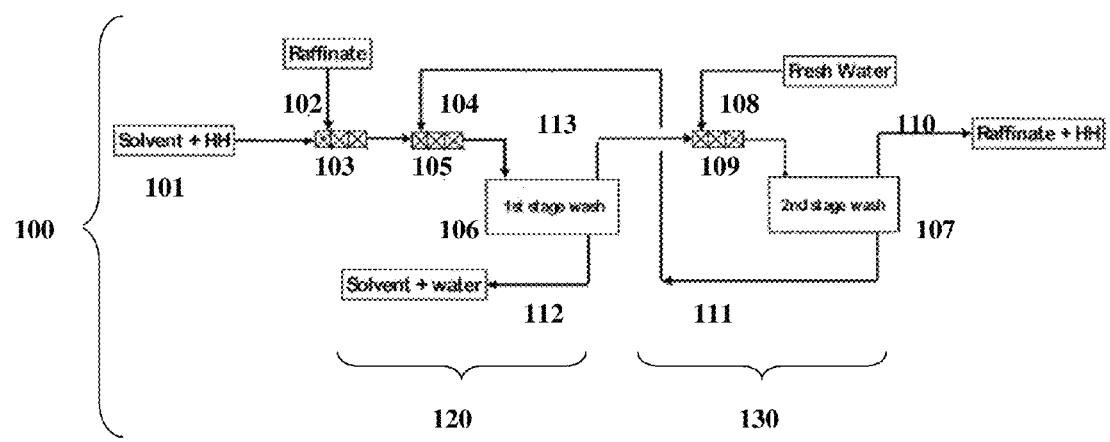
FIG. 1 shows an illustrative heavy hydrocarbon removal system.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing a particular embodiment of the disclosure and are not intended to be limiting thereto. Drawings are not necessarily to scale.

While most of the terms used herein will be recognizable to those of skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not, unless specifically stated in this specification or if the incorporation is necessary for maintaining validity.

"Raffinate," as used herein, refers to, for example, light hydrocarbons.

Heavy hydrocarbon buildup in refinery systems such as, for example, extractive distillation systems can be problematic, particularly when the systems have a closed-loop circulation. Oftentimes, heavy hydrocarbon buildup occurs gradually over time, for example, when the boiling point of the heavy hydrocarbons is close to the boiling point of the material being produced in the closed-loop system. In such cases, separation of heavy hydrocarbons by simple distillation can be difficult or is otherwise energy inefficient. When separation is difficult and, heavy hydrocarbons build up over time, performance of the refinery system can be fouled. In such cases where separation of heavy hydrocarbons is not easily accomplished, alternative separation methods are often used to maintain production quality and optimal system performance. In the discussion that follows, an illustrative refinery process of extractive distillation is described. However, one of ordinary skill in the art will recognize that the apparatuses and methods for removing heavy hydrocarbons described herein may be used for any of a number of refinery processes where it is desirable to remove heavy hydrocarbons. The apparatuses and methods discussed hereinbelow incorporate a light hydrocarbon extraction to remove heavy hydrocarbons from a solvent stream in an extractive distillation process. The apparatuses and methods are advantageous over existing apparatuses and methods in that other than the heavy hydrocarbon output stream produced, there is a very low quantity of water and organic waste streams that have to be dealt with in operating the apparatuses or practicing the methods.

In various embodiments, apparatuses for removing heavy hydrocarbons from a solvent stream are disclosed. The apparatuses include a first extractive unit, a second extractive unit and a light hydrocarbon input line coupled to the first extractive unit. The first extractive unit includes a first water input line, a solvent stream output line, and a first heavy hydrocarbon output line. The first heavy hydrocarbon output line is coupled to the second extractive unit. The second extractive unit includes a second water input line, a second water output line, and a second heavy hydrocarbon output line. The second water output line adjoins the first water input line. The apparatuses allow batchwise processing of a solvent stream containing heavy hydrocarbons. The apparatuses can be operated continuously in certain embodiments.

In some embodiments, the apparatuses include detection sensors for monitoring the solvent stream and automatically activating the apparatuses when deemed necessary to remove heavy hydrocarbons from the solvent stream. For example, a threshold concentration of heavy hydrocarbons may be reached in the solvent stream and trigger the operation of the apparatuses. In some embodiments, the flow rate of the solvent stream can dictate an event suggesting that heavy hydrocarbon removal should be performed. For example, as heavy hydrocarbons build up in the solvent stream, the solvent stream viscosity may become too great for optimal system operation, and activation of the apparatuses based on viscosity of the solvent stream may take place. The apparatuses for removing heavy hydrocarbons can also be triggered automatically by detecting, for example, a concentration of heavy hydrocarbons in the solvent stream above a certain allowable level. In some embodiments, the allowable level is about 1 wt. % heavy hydrocarbons, in others about 5 wt. %, in others about 10 wt. %, in others about 20 wt. %, in others about 30 wt. %, in others about 40 wt. %, in others about 50 wt. %, and in still others greater than about 50 wt. %. Concentration detection of heavy hydrocarbons may be accomplished, for example, by viscosity measurement. One of ordinary skill in the art will recognize that the concentration of heavy hydrocarbons in the solvent stream will at least initially depend on the concentration of heavy hydrocarbons in the original petroleum feed upon which extractive distillation is performed.

In various embodiments of the apparatuses, the solvent stream comprises a closed-loop solvent stream. As discussed hereinabove, a closed-loop solvent stream is conducive to buildup of heavy hydrocarbons. In various embodiments, the apparatuses further include a solvent regeneration system coupled to the solvent stream output line. For example, solvent can be removed from the solvent stream output line, regenerated with the solvent regeneration system, and placed back into the extractive distillation system Such solvent regeneration systems may include, for example, processes and systems to remove water from the solvent before placing it back into the extractive distillation system. In some embodiments, the solvent regeneration system is a two-stage vaporization system.

In various embodiments, the apparatuses are coupled to an extractive distillation system. In embodiments where the apparatus are coupled to an extractive distillation system, the extractive distillation may be used for extractive distillation of aromatic compounds. Aromatic compounds may include benzene, toluene and xylenes, for example.

When a threshold concentration of heavy hydrocarbons is detected in the closed-loop extractive distillation system, a controlled portion of the solvent containing heavy hydrocarbons is automatically transferred and processed by the apparatuses for removing heavy hydrocarbons disclosed herein. FIG. 1 shows an illustrative heavy hydrocarbon removal system 100. The heavy hydrocarbon removal system includes first extractive unit 120 and second extractive unit 130. A solvent source 101 containing heavy hydrocarbons in a solvent is treated with a light hydrocarbon (LHC) feed from light hydrocarbon input line 102. The light hydrocarbon feed dilutes the mixture of heavy hydrocarbons in the solvent. Mixing is accomplished, for example, in solvent/LHC static mixer 103. Heavy hydrocarbons are extracted in the light hydrocarbons. A first water wash is supplied from first water input line 104. Mixing of the water from first water input line 104 with the solvent/LHC mixture of heavy hydrocarbons occurs in water/solvent/LHC static mixer 105. The apparatuses also include two separators 106 and 107. The first stage separator 106 accomplishes removal of the solvent from the bottom of the separator as a water-containing phase. Removal of the water-based phase occurs through solvent stream output line 112. The solvent stream, which now depleted of heavy hydrocarbons, can be processed further for placement back into the extractive distillation system. Alternately, the water-containing phase containing dissolved solvent can be further processed for solvent recovery, water recirculation, disposal, or a combination thereof. The top phase remaining in first stage separator 106 includes heavy hydrocarbons dissolved in a light hydrocarbon extract.

The top phase in the first stage separator 106 contains a small amount of dissolved or admixed solvent along with the heavy hydrocarbons in the light hydrocarbon extract. For disposal or further processing of the heavy hydrocarbons, is advantageous to remove the remaining solvent from the heavy hydrocarbons dissolved in the light hydrocarbon extract. Following removal of the majority of the solvent in the water-containing phase of first stage separator 106, the heavy hydrocarbons dissolved in light hydrocarbons are transferred from the first stage separator 106 through first heavy hydrocarbon output line 113 and mixed with fresh water supplied from second water input line 108. Mixing of the heavy hydrocarbons in light hydrocarbons takes place in water/heavy hydrocarbon/LHC static mixer 109. The mixture is then transferred to second stage separator 107. The residual solvent in the heavy hydrocarbon/LHC phase is extracted into the second water wash and removed as the bottom layer in second stage separator 107. The heavy hydrocarbon phase is separated as the top layer in second stage separator 107 and removed as a heavy hydrocarbon output stream through second heavy hydrocarbon output line 110. The heavy hydrocarbons obtained through second heavy hydrocarbon output line 110 remain dissolved in a light hydrocarbon solution for further processing. For example, the light hydrocarbons can be removed during further processing or the heavy hydrocarbon output can be directly disposed of.

The water wash removed from the bottom of second stage separator 107 contains primarily traces of solvent not separated from the heavy hydrocarbon/LHC mixture in the first stage separator 106. As such, the water wash so obtained is suitable to be used as a wash for a second time for removing larger quantities of solvent. The apparatuses described herein include a second water output line 111, whereby the water wash removed from second stage separator 107 can be utilized as a first water wash for a second batch of heavy hydrocarbons dissolved in solvent. Second water output line 111 adjoins first water input line 104. Second water output line 111 allows the heavy hydrocarbon separation apparatus 100 to operate as a closed-loop system. The closed-loop setup offered by second water output line 111 is advantageous, since it allows continuous batchwise separation of heavy hydrocarbons from a solvent stream. Further, utilizing the second water wash for a first water wash in subsequent extraction batches lowers waste water disposal costs and mitigates other considerations commonly associated with wastewater.

In other various embodiments, apparatuses for removing heavy hydrocarbons from a solvent stream include a first extractive unit, a second extractive unit and a light hydrocarbon input line coupled to the first extractive unit. The first extractive unit includes a first water input line, a solvent stream output line, and a first heavy hydrocarbon output line. The first heavy hydrocarbon output line is coupled to the second extractive unit. The first water input line is supplied by condensed stripping steam. The second extractive unit includes a second water input line, a second water output line, and a second heavy hydrocarbon output line. In various embodiments of the apparatuses, the solvent stream comprises a closed-loop solvent stream. In various embodiments, the apparatuses further include a solvent regeneration system coupled to the solvent stream output line. In some embodiments, the solvent regeneration system is a two-stage vaporization system.

In some embodiments of the apparatuses, the condensed stripping steam is from aromatic extractive distillation process. In some embodiments of the apparatuses, the stripping steam is produced by a solvent regeneration system.

Figure 2:
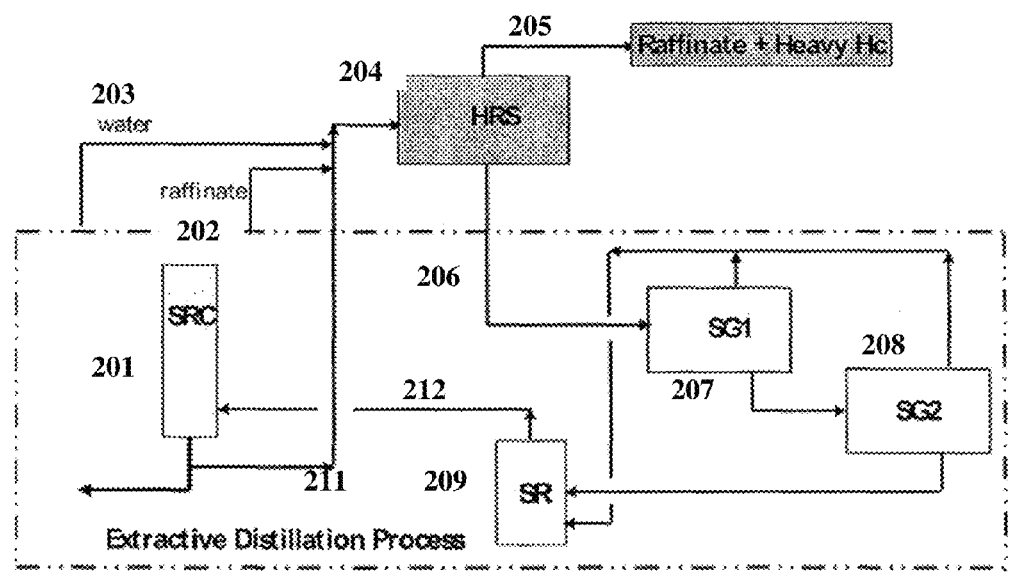
FIG. 2 shows an illustrative coupling of a heavy hydrocarbon removal system to a solvent regeneration system.

An illustrative process for which heavy hydrocarbon removal is advantageous is in aromatic extractive distillation. The aromatic extractive distillation process can be coupled to a heavy hydrocarbon removal apparatus and a solvent regeneration system. FIG. 2 shows an illustrative coupling of a heavy hydrocarbon removal system to a solvent regeneration system. Solvent reservoir 201 is connected an aromatic extractive distillation process. As the solvent in solvent reservoir 201 becomes laden with heavy hydrocarbons, a portion of the solvent is released from solvent reservoir 201 into line 211 en route to heavy hydrocarbon removal system 204. An illustrative heavy hydrocarbon removal system was previously described hereinabove and illustrated in FIG. 1. The solvent containing heavy hydrocarbons is treated with light hydrocarbons from light hydrocarbon input line 202 and water from water input line 203. The mixture of heavy hydrocarbons, solvent, light hydrocarbons and water is fed into heavy hydrocarbon removal system 204. For example, as discussed hereinabove, the mixture of heavy hydrocarbons, solvent, light hydrocarbons and water is passed into a first extractive unit and then a second extractive unit to separate water and solvent from heavy hydrocarbons and light hydrocarbons. Heavy hydrocarbons dissolved in light hydrocarbons are removed through heavy hydrocarbon output line 205. The residual water and solvent depleted of heavy hydrocarbons are removed through line solvent stream output line 206. The residual water and solvent arise from the first extractive separation of water and solvent from a light hydrocarbon solution of heavy hydrocarbons.

In the embodiment shown in FIG. 2, the solvent stream depleted of heavy hydrocarbons is fed from solvent stream output line 206 into a two-stage vaporization system having first vaporization unit 207 and second vaporization unit 208. From the first vaporization unit 207 and second vaporization unit 208, the solvent is passed to a solvent regeneration system 209. The solvent regeneration system 209 generates stripping steam in the course of regenerating the solvent. The stripping steam can be condensed and used in a closed-loop for the water washes of the heavy hydrocarbon removal system (i.e., for water input line 203 above). Purified solvent is fed back to solvent reservoir 201 through line 212, which is thereafter fed back into the aromatic extractive distillation process.

Stripping steam generated from the solvent regeneration system 209 can be condensed and used as at least the first water wash in the heavy hydrocarbon removal system 204. Coupling of the solvent regeneration process to the heavy hydrocarbon removal process provides an advantageous operational benefit. Not only are heavy hydrocarbons removed from the solvent stream, but utilization of the stripping stream in the heavy hydrocarbon removal process minimizes water release as wastewater.

One of ordinary skill in the art will recognize that the heavy hydrocarbon removal system discussed above may be coupled to any of a number of processing conditions wherein removal of heavy hydrocarbons is advantageous, and the embodiment coupled to an aromatic extractive distillation process presented hereinabove should be considered illustrative. One of ordinary skill in the art will further recognize that the apparatuses discussed hereinabove are advantageous in not generating excessive amounts of waste solvent, waste water or waste heat. One of the only organic waste streams generated by the apparatuses is the LHC/heavy hydrocarbon stream. In some embodiments, even the LHC/heavy hydrocarbon stream can be further processed, for example, for blending into a liquid fuel system or by being transferred to another refinery unit, for example, to crack the heavy hydrocarbons into more useful small organics.

In other various embodiments, methods for removing heavy hydrocarbons from a solvent stream are disclosed. The methods include a) providing a first batch of a mixture containing heavy hydrocarbons dissolved in at least one solvent, b) extracting the first batch of the mixture with a light hydrocarbon wash, c) washing the first batch of the mixture with a first water wash to produce a solvent stream depleted in heavy hydrocarbons and a heavy hydrocarbon stream dissolved in light hydrocarbons, d) removing the solvent stream depleted in heavy hydrocarbons, e) washing the heavy hydrocarbon stream dissolved in light hydrocarbons with a second water wash, f) removing the second water wash, and g) isolating an output stream containing heavy hydrocarbons dissolved in light hydrocarbons. In various embodiments, the methods further include providing a second batch of a mixture containing heavy hydrocarbons and repeating the method steps. Accordingly, methods for removing heavy hydrocarbons as herein disclosed can be conducted continuously.

In various embodiments of the methods, the solvent stream is a closed-loop solvent stream. In various embodiments of the methods, the solvent stream includes aromatic compounds. In various embodiments of the methods, the extracting step removes heavy aromatic compounds.

In various embodiments of the methods, the second water wash used to wash the first batch of the mixture is subsequently transferred in a closed-loop system such that the second water wash becomes the first water wash for a second batch of the mixture containing heavy hydrocarbons and at least one solvent. Such reuse of the second water wash has been described in more detail hereinabove. In various embodiments, the methods further include regenerating the at least one solvent from the solvent stream depleted in heavy hydrocarbons. The regenerating step includes using a solvent regeneration system. The solvent regeneration system regenerates solvent for re-introduction back into the solvent stream. In various embodiments of the methods, the first water wash comprises condensed stripping steam produced by the solvent regeneration system.

In various embodiments of the methods, a threshold concentration of heavy hydrocarbons dissolved in the at least one solvent triggers operation of the method. Various threshold parameters and methods of sensing the threshold concentration have been considered hereinabove. In various embodiments, the methods further include transferring the heavy hydrocarbon stream dissolved in light hydrocarbons prior to the second washing step.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. An apparatus for removing heavy hydrocarbons from a solvent stream, said apparatus comprising:
   a first mixer comprising an inlet and an outlet;
   a second mixer comprising an inlet in fluid communication with the outlet of the first mixer, and an outlet;
   a first stage separator comprising:
      an inlet in fluid communication with the second mixer outlet;
      a bottom stream outlet for communicating a bottom stream from the first stage separator; and
      a heavy hydrocarbon stream outlet for communicating a heavy hydrocarbon stream from the first stage separator;
   a third mixer comprising an inlet in fluid communication with the heavy hydrocarbon stream outlet, and an outlet;
   a second stage separator comprising:
      an inlet in fluid communication with the outlet of the third mixer;
      a water wash outlet for communicating a water wash stream from the second stage separator to the second mixer; and
      a heavy hydrocarbon stream outlet for communicating a heavy hydrocarbon stream from the second stage separator.

2. The apparatus of claim 1, wherein the first mixer comprises a second inlet.

3. The apparatus of claim 1, wherein the third mixer comprises a second inlet.

4. The apparatus of claim 1, wherein the water wash outlet is in fluid communication with the second mixer.

5. The apparatus of claim 1, wherein the first mixer inlet is in fluid communication with a solvent reservoir.

6. The apparatus of claim 1, wherein the bottom stream outlet of the first stage separator is in fluid communication with a vaporization unit.

7. The apparatus of claim 1, further comprising a sensor for monitoring the solvent stream.

8. The apparatus of claim 7, wherein the sensor detects a flow rate of the solvent stream.

9. The apparatus of claim 7, wherein the sensor detects a concentration of heavy hydrocarbons in the solvent stream.

10. The apparatus of claim 9, wherein the concentration of the heavy hydrocarbons is measured by measuring a viscosity of the solvent stream.

* * * * *